United States Patent [19]

Murata

[11] Patent Number: 5,509,067
[45] Date of Patent: Apr. 16, 1996

[54] METHOD AND APPARATUS FOR SPEED DIALING VIA ONE-TOUCH AND TWO-TOUCH OPERATION

[75] Inventor: Yukio Murata, Yokohama, Japan

[73] Assignee: Canon Kabushiki Kaisha, Tokyo, Japan

[21] Appl. No.: 22,547

[22] Filed: Feb. 25, 1993

[30] Foreign Application Priority Data

Feb. 26, 1992 [JP] Japan .................................. 4-038309

[51] Int. Cl.⁶ ................................................ H04M 1/26
[52] U.S. Cl. ........................... 379/355; 379/354; 379/200
[58] Field of Search ...................................... 379/354, 355, 379/356, 357, 396, 368, 200, 369, 188, 368; 341/23

[56] References Cited

U.S. PATENT DOCUMENTS

| | | | |
|---|---|---|---|
| 4,005,388 | 1/1977 | Morley et al. | 341/23 |
| 4,243,845 | 1/1981 | Feinberg et al. | 379/368 |
| 4,453,040 | 6/1984 | Wolf et al. | 379/355 |
| 4,709,387 | 11/1987 | Masuda | 379/356 |
| 4,800,582 | 1/1989 | D'Agosto, III et al. | 379/355 |
| 4,825,464 | 4/1989 | Wen | 379/368 |
| 4,885,580 | 12/1989 | Noto et al. | 341/23 |
| 4,885,762 | 12/1989 | Suzuki et al. | 379/200 |
| 4,908,853 | 3/1990 | Matsumoto | 379/379 |
| 4,982,423 | 1/1991 | Muroi | 379/355 |
| 5,134,653 | 7/1992 | Satomi et al. | 379/354 |
| 5,138,655 | 8/1992 | Takashima et al. | 379/357 |
| 5,182,766 | 1/1993 | Garland | 379/355 |
| 5,216,705 | 6/1993 | Yoshida et al. | 379/100 |
| 5,247,572 | 9/1993 | Koma | 379/200 |
| 5,303,288 | 4/1994 | Duffy et al. | 379/59 |
| 5,363,437 | 11/1994 | Shen et al. | 379/355 |

Primary Examiner—Ahmad F. Matar
Assistant Examiner—Scott L. Weaver
Attorney, Agent, or Firm—Morgan & Finnegan

[57] ABSTRACT

A dial calling method in which a multiplicity of dialing information items can be registered while decreasing the number of keys and simplifying the operation and which is capable of abbreviated-dialing and one-touch-dialing a multiplicity of called parties in accordance with the registered dialing information, and to a communication apparatus which use the method. Dialing information concerning the called party, inputted by using function keys and a ten-key keyboard, is registered in a storage unit, whose address is specified in accordance with the input sequential number of the dialing information and in accordance with the depressed function key. If the abbreviated dialing is performed, the registered dialing information is read by depressing the function key and by inputting the number which corresponds to the input sequential number by using the ten-key, so that dialing is performed.

21 Claims, 11 Drawing Sheets

FIG. 11A

LIST OF DIAL REGISTERED PERSON

0 PUBLIC
1 FATHER
2 MOTHER
3 BROTHER
4 SISTER
5 - - - - -
6
7
8
9

FIG. 11B

NO. 3  ONE-TOUCH-DIALING
       REGISTRATION LIST

USER  BROTHER

A  COMPANY 045-345-5643
B  FRIEND A 0345-12-1131
C  FRIEND B 03-5712-9873
D  FRIEND C 045-312-3740
E  - - - - -
F
G
H

METHOD AND APPARATUS FOR SPEED DIALING VIA ONE-TOUCH AND TWO-TOUCH OPERATION

BACKGROUND OF INVENTION

The invention relates to a dial method and a communication apparatus which uses the method and, more particularly to a dial method of communicating with a called station by transmitting predetermined dialing information to a line and a communication apparatus which uses the method.

Hitherto, there is a known communication apparatus, such as a telephone set, for conversation with a called station or a facsimile apparatus for transmitting/receiving image information by storing in a memory the telephone numbers of desired called stations and by making a call to a station by using the telephone number stored in the memory by operating a key of a specified abbreviated dialing or the operation of a one-touch-dialing key.

The communication apparatus of the aforesaid type usually performs dialing operation when a ten-key thereof is operated to input the telephone number of a called station. The communication apparatus has a function for abbreviating the operation for making a call to a station with which communication is frequently made. For example, the telephone number is registered to a one-touch-dialing key and a desired key is depressed at the time of making a call. As a result, calling a party is made by using the telephone number which corresponds to the depressed key. Furthermore, specific telephone numbers are registered in the memory in such a manner that the telephone numbers correspond to specific abbreviated numbers, for example, 00 to 99. When making a call, the desired abbreviated number is inputted by depressing the keys to make a call by using the telephone number which corresponds to the depressed abbreviated number.

In order to use the one-touch-dialing keys which have been registered, a sticker or the like, on which the names or abbreviations of the parties to be called are written, is applied to a position adjacent to (on the side or below) the one-touch dialing keys corresponding to the registered telephone numbers. As a result, a user is able to quickly recognize the called party key assignment.

However, the above-mentioned conventional approach encounters a necessity of having an operation board that has a large area to register a large number of one-touch-dialing keys because the number of telephone numbers can be registered is the same as the number of the one-touch-dialing keys. This leads to an apparatus which must have a large size and the overall cost cannot be reduced. If many one-touch-dialing keys are equipped, a user sometimes takes a long time to determine the key corresponding to the called station.

If abbreviated dialing is used, a list showing the relationship between the registered called parties and the telephone numbers must be previously stored in order to recognize the correspondence between the abbreviated numbers and the telephone numbers of the called parties. Therefore, the actual operation management is complicated because the list must be placed at an appropriate position adjacent to the apparatus and updating of the telephone number requires a new list to be made. As described above, visually searching the list is only a convenient way capable of searching abbreviated dial data for the conventional approach of employing an abbreviated dialing. Therefore, the conventional approach encounters a problem in that the registered abbreviated number cannot be used sufficiently except for the case where abbreviated dial is stored in the apparatus.

In an apparatus operation environment such as in an office, a communication terminal equipment such as a facsimile apparatus is usually shared by a multiplicity of persons. In the aforesaid operation environment, the apparatus usually has a sufficiently large number of programmable function keys and the one-touch-dialing keys are not available.

SUMMARY OF THE INVENTION

Accordingly, it is an object of the present invention to provide a dial method in which dialing information is registered by a simple operation and the information is searched by using a programmable function key and a ten-key keyboard to dial the information.

According to the present invention, the foregoing object is attained by providing a dial method adapted to a communication apparatus having a ten-key keyboard and programmable function keys comprising: an input step of inputting a plurality of abbreviated dialing information, each of which corresponds to a called party and is related to one of the programmable function keys, a registration step of registering each set of the abbreviated dialing information on a recording medium in such a manner that a storage address of the recording medium can be specified by the input sequential number of each set of the abbreviated dialing information inputted in the input step and the programmable function key, a readout step of reading the abbreviated dialing information registered to the storage medium by depressing the programmable function key and the number which corresponds to the input sequential number, and a dialing step of dialing by using the abbreviated dialing information read in the readout step.

It is another object of the present invention to provide a communication apparatus capable of registering abbreviated dialing information by a simple operation and abbreviated-dialing by using the information.

According to the present invention, the foregoing object is attained by providing a communication apparatus capable of abbreviated-dialing a called party by transmitting predetermined information to a line comprising: a ten-key keyboard, a plurality of programmable function keys, registration means for registering abbreviated dialing information by using the ten-key keyboard and said plurality of programmable function keys, storage means for storing a plurality of abbreviated dialing information which correspond to a plurality of called parties, and dialing means, when one of the plurality of function keys has been depressed and then the ten-key keyboard has been depressed, for dialing by reading the abbreviated dialing information for a corresponding called party from an area of the storage means in accordance with the depressed function key and input of the ten-key keyboard.

In accordance with the present invention as described above, a plurality of abbreviated dialing information are registered and abbreviated dialing is performed by using a ten-key keyboard and a function key.

It is another object of the present invention to provide a dial method in which dialing information is registered by a simple operation and the information to be dialed is searched by using a ten-key keyboard and a one-touch-dialing key.

According to the present invention, the foregoing object is attained by providing a dial method adapted to a communication apparatus having a ten-key keyboard and onetouch-dialing keys, which is shared by a plurality of users, using identification numbers uniquely assigned to the plurality of users comprising: an input step of inputting an identification number, dialing information of a called party and a code number, an inspection step of inspecting a corresponding code number for the identification number, a registration step of registering the abbreviated dialing information to a recording medium in such a manner that a storage address of the recording medium can be specified by the identification number inputted in the input step and the one-touch-dialing key, a readout step of reading the dialing information registered in the storage medium, and a dialing step of dialing by using the dialing information read in the readout step.

It is another object of the present invention to provide a communication apparatus in which dialing information is registered by a simple operation and the information to be dialed is searched for by using a ten-key keyboard and a one-touch-dialing key.

According to the present invention, the foregoing object is attained by providing a communication apparatus having a plurality of one-touch-dialing keys, which are shared by a plurality of users to whom identification numbers are uniquely assigned, and capable of transmitting predetermined information to a line by one-touch-dialing in order to communicate with a called party, comprising: a ten-key keyboard, a plurality of one-touch-dialing keys, registration means for registering dialing information for one-touch-dialing in accordance with the identification number, storage means for storing the dialing information registered by the registration means in such a manner that a storage address can be specified by the identification number and one of the plurality of one-touch-dialing keys, instruction means, when anyone of the plurality of one-touch-dialing keys is depressed and the identification number is then inputted, for instructing to dial a desired called party based on the plurality of dialing information stored in the storage means, and dialing means for dialing by reading dialing information for the corresponding called party from the storage means in accordance with the instruction made by the instruction means.

In accordance with the present invention as described above, a plurality of dialing information are registered by using a ten-key keyboard and a one-touch-dialing key, and one-touch-dialing is performed.

The invention is particularly advantageous since a multiplicity of dialing information can be registered by a small number of keys and abbreviated dialing and one-touch-dialing operations can be performed to a multiplicity of called stations. Therefore, the number of keys in the operation unit can be decreased, the apparatus can be simplified and the cost of the apparatus can be reduced. Furthermore, registration of the dialing information and the searching operation can easily be performed. In an operational environment in which a plurality of users shares the apparatus, each user is able to perform the abbreviated dialing and one-touch-dialing operations by a simple operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 11A and 11B illustrate an example of registered information outputted according to the second embodiment.

DESCRIPTION OF THE PREFERRED EMBODIMENTS

Preferred embodiments of the present invention will now be described in detail in accordance with the accompanying drawings.

Two embodiments of a communication apparatus such as a facsimile apparatus and a telephone set will now be described each of which is connected to a communication line, for example, a telephone line, and which outputs a predetermined dialing information (the telephone number or the like) to the line at the time of dialing.

<Description of Common Portion (FIG. 1)>

Figure 1:
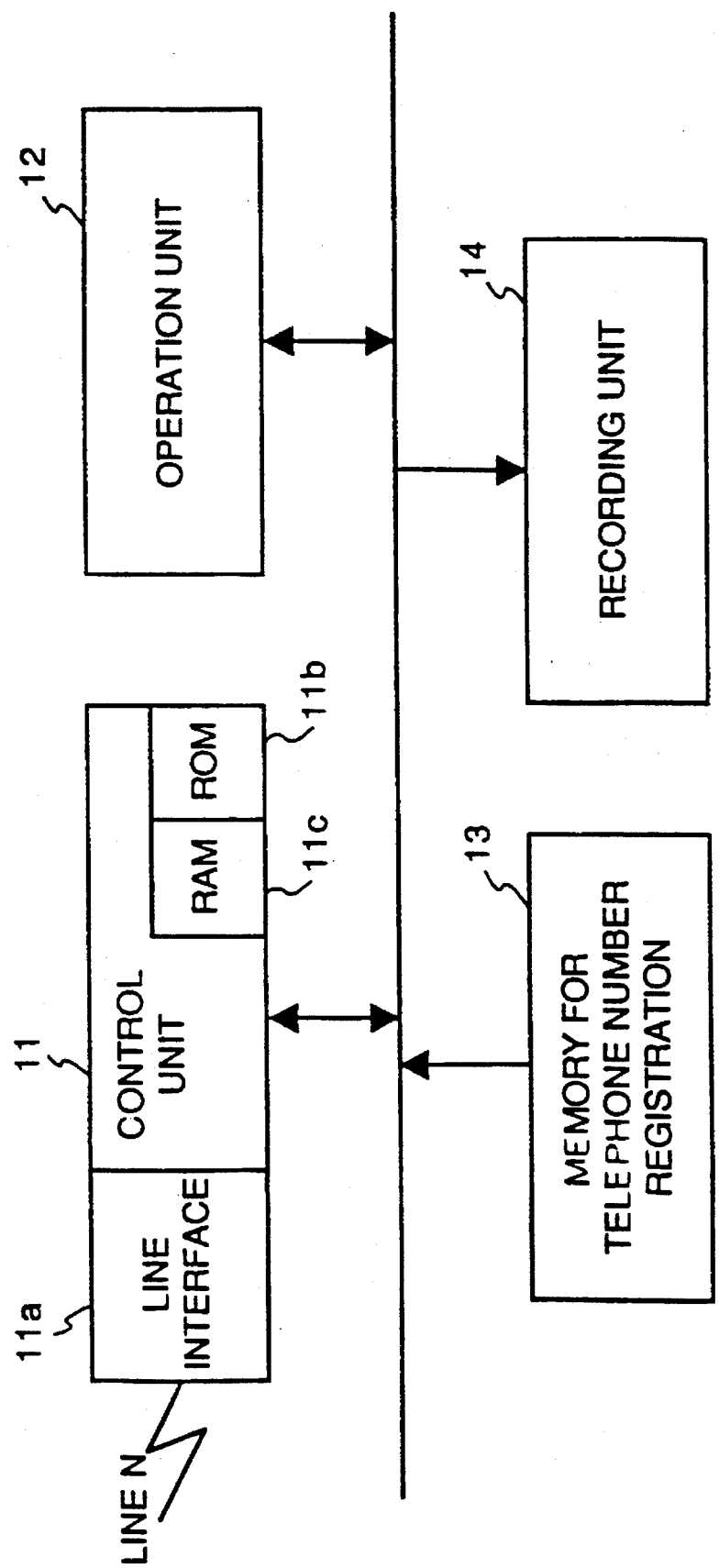
FIG. 1 is a block diagram which illustrates the layout of a communication apparatus which is a typical embodiment of the present invention.

The layout of a communication apparatus which is a common portion of the two embodiments will now be described. FIG. 1 is a block diagram which illustrates the layout of the communication apparatus which is the common portion of the present invention. Referring to FIG. 1, reference numeral 11 represents a control unit comprising a microprocessor (hereinafter called an "MPU"), a line interface 11a, a ROM 11b, a RAM 11c and an I/O port (not shown). Reference numeral 12 represents an operation unit comprising various keys and a display. Reference numeral 13 represents a RAM for telephone number registration (hereinafter called a "memory") for storing the telephone numbers of called stations. Reference numeral 14 represents a recording unit for outputting the telephone number stored by the RAM 13 and outputting received data. If the apparatus according to this embodiment is a facsimile apparatus, the recording unit serves as a printer for recording an image.

The control unit 11 totally controls the apparatus, controls the operation unit 12, communication and an operation of storing telephone numbers. The line interface 11a accommodates an NCU and a dialing signal generator adapted to the dialing method, the line interface 11a being connected to a telephone line N by way of the NCU. The ROM 11b stores a control program (to be described later) which is executed by the MPU. The RAM 11c is used to serve as a working area when the MPU executes the control program and a dial data buffer for temporarily storing telephone number data for use at the time of making a dial call.

The operation unit 12 serves as a user interface through which a variety of key inputs are made and which causes the display to display a variety of messages.

The descriptions will now be made on the operations of making a call performed by the two embodiments each of which comprises the communication apparatus constituted as described above. Each of which comprises the operation units having different layouts.

<First Embodiment (FIGS. 2 to 4)>

Figure 2:
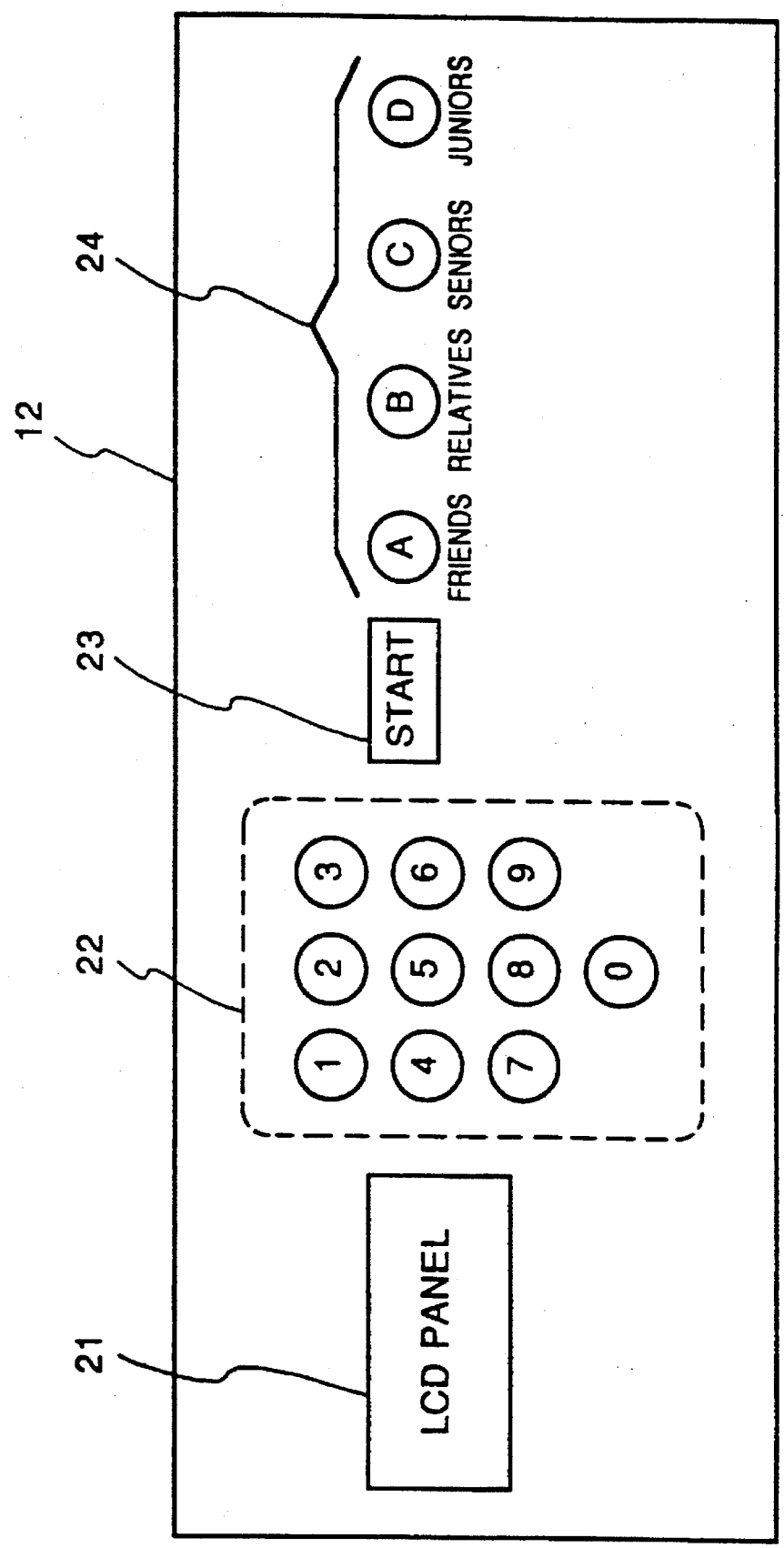
FIG. 2 is a top view which illustrates an operation unit of the communication apparatus according to a first embodiment.

FIG. 2 illustrates the layout of the top surface of the operation unit 12 according to this embodiment. Referring to FIG. 2, reference numeral 21 represents an LCD panel for displaying a variety of message, 22 represents a ten-key keyboard, 23 represents a start key, and 24 represents programmable function keys (A to D). The programmable function keys A to D will be called "PF keys" in a manner such that the programmable function key A is called a key PF "A", the programmable function key B is called a key PF "B", the programmable function key C is called a key PF "C", and the programmable function key D is called a key PF "D".

The communication apparatus according to this embodiment has an arrangement that each of the PF keys 24 is provided with a storage area in the RAM 13. Each storage area is able to store a sole or a plurality of (10 or less according to this embodiment) registered telephone numbers. Therefore, the PF keys of the communication apparatus according to this embodiment do not respectively correspond to the telephone numbers but has a plurality of telephone numbers assigned thereto. If a telephone number is registered, the telephone number registered in the RAM 13 can be searched and read out in accordance with the combination of the PF key 24 and the ten-key keyboard 22. As a result, dialing operation is executed.

(1) Telephone Number Registration Processing

Figure 3:
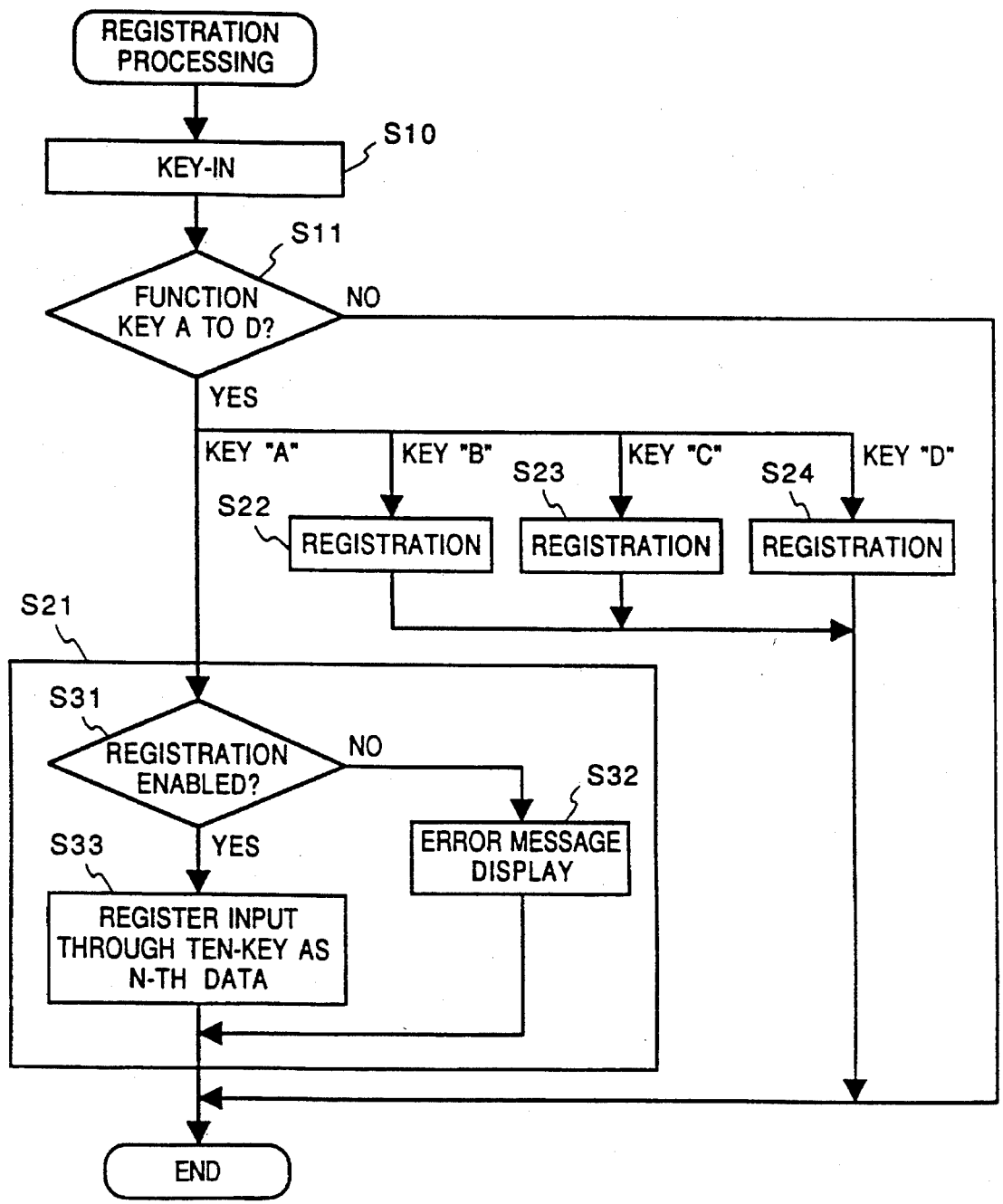
FIG. 3 is a flow chart which illustrates telephone numbers registration processing according to the first embodiment.

The processing of registering telephone numbers in the RAM 13 will now be described with reference to the flow chart shown in FIG. 3. The procedure of registering the telephone numbers is stored in the ROM 11b as a control program.

When a predetermined PF key (not shown) for instructing the commencement of the telephone number registration processing is depressed, the apparatus is brought into a telephone number registration mode.

In step S10, a key inputting operation is first performed to register the telephone number. In step S11, which of the four PF "A" to "D" keys 24 is depressed is detected. If it is sensed that any one of the PF keys 24 has been depressed, the flow proceeds to anyone of steps S21 to S24 in accordance with the depressed PF key. That is, if the key PF "A " has been depressed, the flow proceeds to step S21. If the key PF "B" has been depressed, the flow proceeds to step S22. If the key PF "C" has been depressed, the flow proceeds to step S23. If the key PF "D" has been depressed, the flow proceeds to step S24. If it is sensed that the depressed key is not a PF key 24, the process is terminated here. Since common processing is executed in the steps S21 to S24 except for the subject memory area in the RAM 13, only the processing to be executed in step S21 is described in the flow chart shown in FIG. 3.

The processing to be executed in step S21 is composed of steps S31 to S33. In step S31, it is determined whether or not the telephone number can be registered to a telephone number storage area of the RAM 13 which corresponds to the key PF "A" key in accordance with a predetermined discrimination criterion. As for the criterion, whether or not the 10 telephone numbers have been registered is discriminated if the 10 telephone numbers can be registered to one PF key as arranged in this embodiment. If the telephone number cannot be registered to the corresponding region of the RAM 13, the flow proceeds to step S32 in which an error message is displayed on an LCD panel 21 to terminate the registration processing. If a discrimination is made that the telephone number can be registered, the flow proceeds to step S33 in which the telephone number of the called station is inputted by using the ten-key keyboard 22. Furthermore, the inputted data is stored in an area of the RAM 13 which corresponds to the key PF "A" in accordance with a predetermined storage format.

As a result of the registration processing, the telephone number is stored in the first address of 10 areas (hereinafter called "PFA areas") of the RAM 13 assigned to the key PF "A" if the subject telephone number is the first number registered to the key PF "A". The telephone number thus stored is read out from the RAM 13 when the key PF "A" and the key "0" of the ten-key keyboard 22 are depressed at the time of the dialing operation. Likewise, if the telephone number is a number registered second, the number is stored in the second address of the PFA area and is read from the RAM 13 when the key PF "A" and the key "1" of the ten-key 22 are depressed. The telephone numbers registered at the third to tenth times are similarly processed. As described above, the address of the RAM 13 for storing the telephone number is determined by the PF key 24 and the sequential order of the registration of the telephone number by the ten-key keyboard entry. The storage address is specified at the time of the dialing operation in accordance with the combination of the PF key 24 and the number of the ten-key keyboard 22 which corresponds to the registration order.

The processing of registering the telephone number is performed as described above. If the registration processing is performed in such a manner that the PF keys corresponding to the called stations are assigned to friends, relatives, superiors, juniors or clients, the dialing process to be described later can be performed more effectively.

(2) Dialing Processing

The dialing processing to be performed by using the telephone number registered in the RAM 13 will now be described with reference to a flow chart shown in FIG. 4. The dialing operation is performed by using the ten-key keyboard 22, the start key 23 and the PF key 24.

When the key input operation for making a call is performed in step S110, the flow proceeds to step S111 in which a discrimination is made as to whether or not the depressed key is one of the four keys PF "A" to "D" similarly to the processing executed in step S11. If a discrimination is made that one of the PF keys 24 has been depressed, the flow proceeds to anyone of steps S121 to S124 in accordance with the depressed PF key.

That is, if the key PF "A" has been depressed, the flow proceeds to step S121. If the key PF "B" has been depressed, the flow proceeds to step S122. If the key PF "C" has been depressed, the flow proceeds to step S123. If the key PF "D" has been depressed, the flow proceeds to step S124. If a discrimination is made that the depressed key is not the PF key 24, the process is terminated here.

Figure 4:
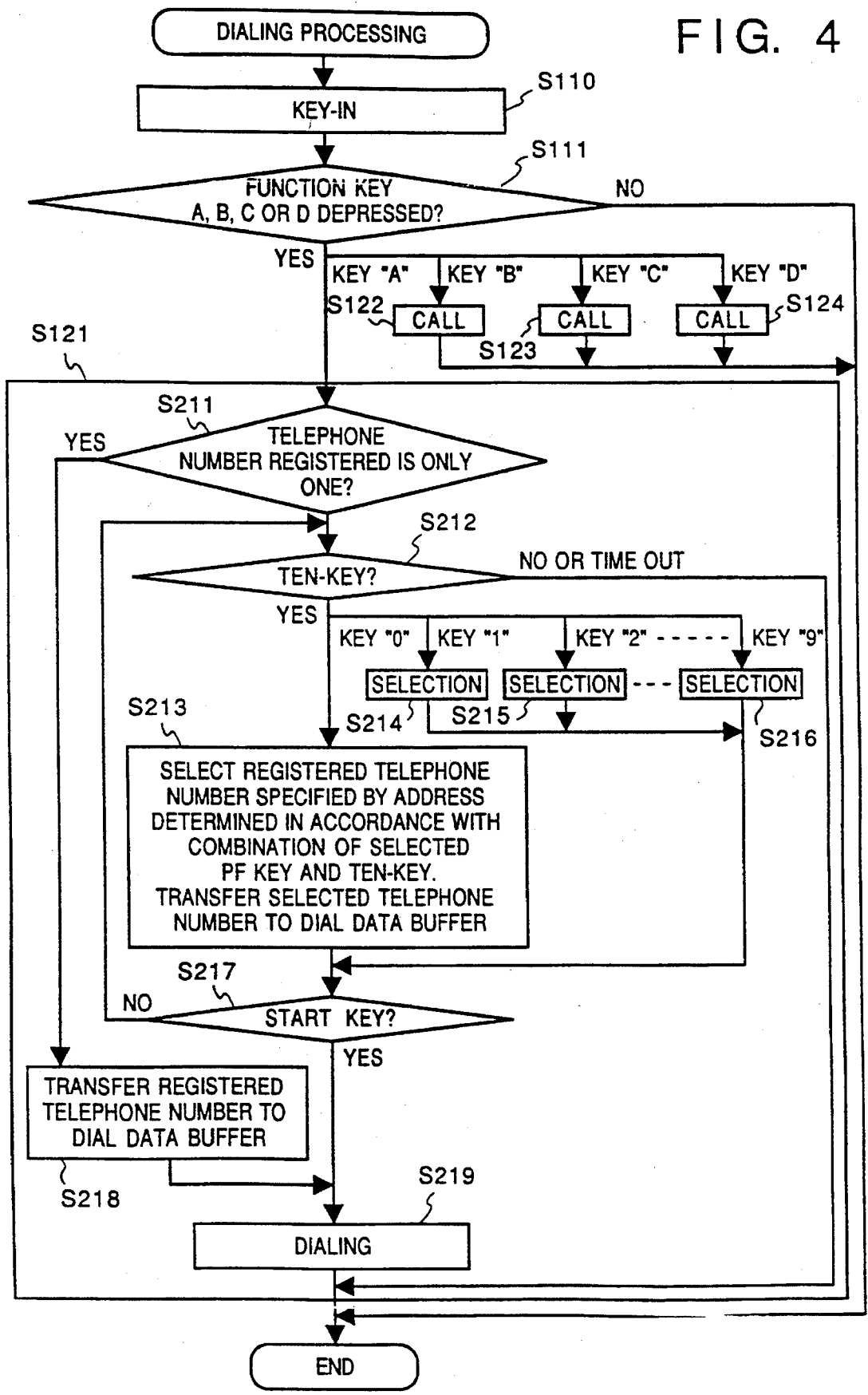
FIG. 4 is a flow chart which illustrates the procedure of a dial operation according to the first embodiment.

Since a common processing is executed in the steps S121 to S124 except for the subject memory area in the RAM 13, the processing to be executed in step S121 is described in the flow chart shown in FIG. 4. Here, only the processing of step S121 corresponding to the key PF "A" will now be described.

The processing to be executed in step S121 is composed of steps S211 to S219.

In step S211, a discrimination is made as to whether or not one telephone number has been registered in the key PF "A". If a discrimination is made that only one telephone number has been registered, the flow proceeds to step S218 where a dial call is performed by using the registered telephone number. Furthermore, the telephone number is transferred to the dial data buffer of the RAM 11c. If a plurality of telephone numbers have been registered to the key PF "A", the registered data is displayed on the LCD panel 21. If 10 telephone numbers have been registered to the numbers "0" to "9" of the ten-key keyboard 22, the 10 registered telephone numbers are displayed on the LCD panel 21. Then, the flow proceeds to step S212 in which an input made by using the ten-key 22 is waited for a predetermined time.

If the fact that the ten-key keyboard 22 has been depressed is detected in step S212, the flow proceeds to anyone of steps S213 to S216 in accordance with the depressed number, so that processing corresponding to the depressed figure among "0" to "9" of the ten-key 22 is executed. If the fact that the ten-key keyboard 22 has been depressed is not detected for a predetermined time, the call making processing is terminated.

If "0" of the ten-key 22 has been depressed, the telephone number is addressed and selected in step S213 in such a manner that the storage address in the RAM 13 is specified in accordance with the combination of the key PF "A" and "0" of the ten-key keyboard 22. As a result of the executed selection processing, subject data among registered data corresponding to the key PF "A" and displayed on the LCD panel 21 corresponding to "0" of the ten-key keyboard 22 is displayed in a reverse video manner. Simultaneously, the registered telephone number is transferred to the dial data buffer of the RAM 11c to perform a processing of preparing for the dial calling operation.

If anyone of "1" to "9" of the ten-key keyboard 22 has been depressed, a processing similar to that to be executed in step S213 is executed in anyone of steps S214 to S216. Then, a discrimination is made in step S217 as to whether or not the start key 23 has been depressed. If a user has confirmed the telephone number which is reverse-color displayed within a predetermined time and has depressed the start key 23, the flow proceeds to step S219 in which dial calling is performed by using the telephone number transferred to the dial buffer. If a fact that the start key 23 is not depressed has been detected within a predetermined time, the flow returns to step S212 in which an input to be made by using the ten-key keyboard 22 is waited for.

Since this embodiment has an arrangement that a plurality of telephone numbers are registered to one PF key and the registered telephone number can be read out in accordance with the combination between the PF key and the ten-key keyboard, the dialing operation of anyone of a plurality of the registered telephone numbers can be performed by a simple process. Therefore, a conventional necessity of providing a multiplicity of one-touch-dialing keys corresponding to the number of the called stations can be eliminated. Hence, the operation unit having a reduced number of keys can be constituted. As a result, the structure of the apparatus can be simplified and the overall cost of the apparatus can be reduced.

Furthermore, this embodiment enables a dial call to be made to the called party having the registered telephone number by a one-key operation if the telephone numbers (the called party of the communication) and the PF keys are made to correspond to one another, that is, if only one telephone number is registered to one PF key. Therefore, the operation of calling the party with which communication is performed frequently can be further simplified.

Although this embodiment has the arrangement that a desired telephone number is searched by using the ten-key keyboard, the present invention is not limited to this. For example, another arrangement may be employed in which a desired telephone number can be selected from registered telephone numbers or called party's names displayed on the LCD panel 21, a cursor or a marker can be displayed on the LCD panel 21, and a PF key for instructing the movement of the cursor or the marker is provided to enable the telephone number to be searched. As for information to be displayed on the LCD panel 21, only the called party's name may be displayed.

Although 10 or less telephone numbers are registered to one PF key 24 according to this embodiment, the present invention is not limited to this. For example, an arrangement may be employed in which a sufficient memory area is kept in the RAM 13 and the stored telephone number is selected by depressing a plural-digit figure by using the ten-key keyboard after the PF key has been depressed.

Although this embodiment has an arrangement that the numbers, which can be selected by using the ten-key keyboard after the PF key has been depressed at the time of the dial calling operation, is determined in accordance with the registering order of the telephone numbers at the time of the registering process, the number of the ten-key keyboard may be changed by a user even if the registration has been performed or the same may be instructed at the time of the registration.

<Second Embodiment (FIGS. 5 to 9)>

The first embodiment has an arrangement that a plurality of telephone numbers are registered to one programmable function key and dial calling operation is performed by reading a desired telephone number from the RAM in accordance with the combination of the depressed programmable function key and the depressed ten-key keyboard. This embodiment has another arrangement that a security function for the telephone number registration processing is provided and a one-touch-dialing key is used for the dialing operation.

Figure 5:
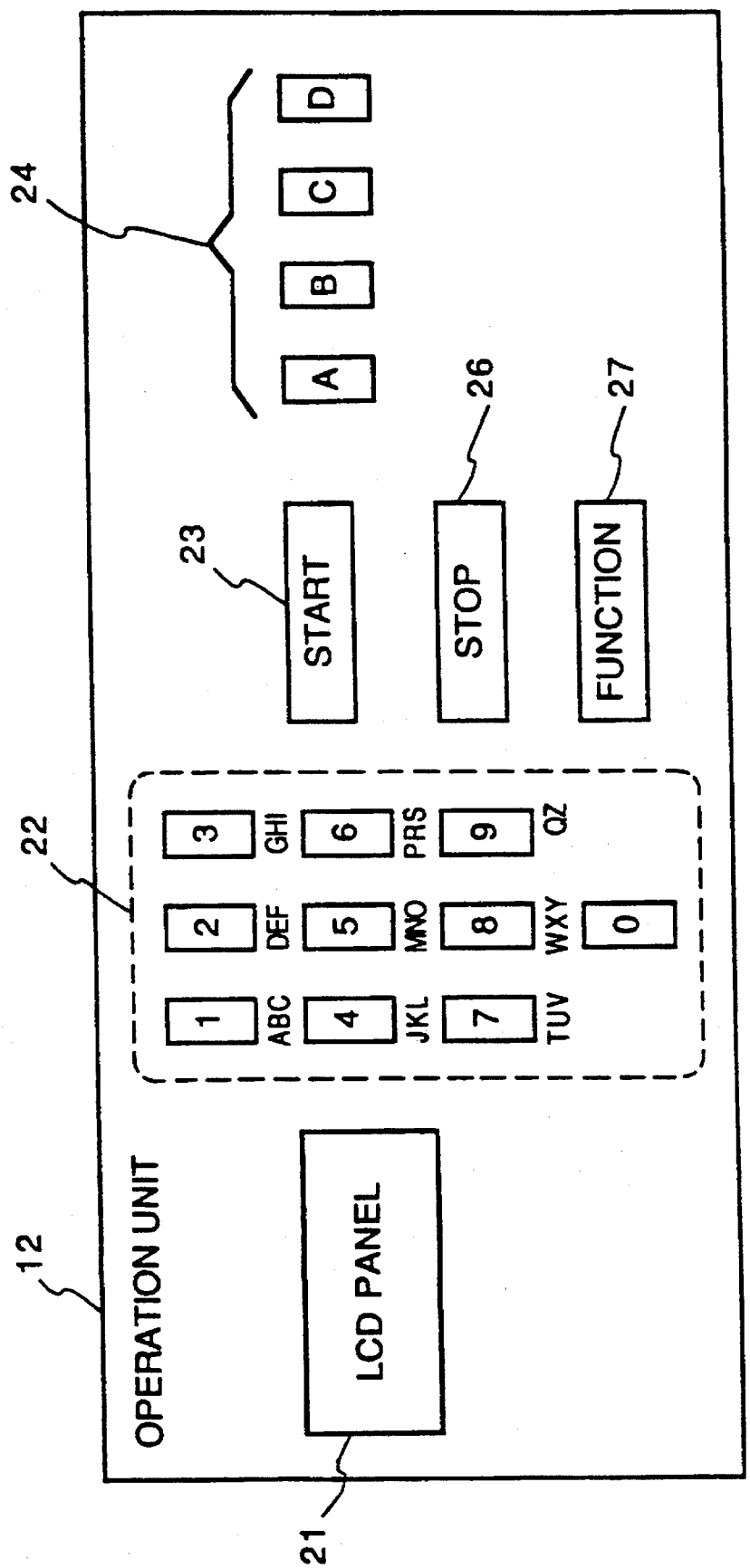
FIG. 5 is a top view which illustrates an operation unit of the communication apparatus according to a second embodiment.

FIG. 5 illustrates the layout of the top surface of the operation unit 12. As shown in FIG. 5, the outlook of the operation unit 12 is substantially the same as that according to FIG. 2 except for a stop key 26 and a programmable function key 27 provided additionally to the start key 23. Although the key 24 according to the first embodiment is the programmable function key, the key 24 according to this embodiment is a one-touch-dialing key.

Similar to the conventional one-touch key, the key 24 according to this embodiment can be used to dial the called station which corresponds to the depressed key 24. Furthermore, the key 24 can be used to specify the registered dial information similarly to the first embodiment by first depressing the ten-key 22 and by depressing the key 24 afterwards.

The ten-key keyboard 22 according to this embodiment is also able to input alphabetical letters ("A" to "Z") as well as the figures ("0" to "9"). As shown in FIG. 5, the "1" key of the ten-key keyboard 22 is able to input "A", "B" and "C" as well as the figure "1". If a user depresses the "1" key one time, the figure "1" is inputted. If it is depressed two times, "A" is inputted. If it is depressed three times, "B" is inputted. If it is depressed four times, "C" is inputted.

The descriptions will now be made on a telephone number registration processing, a dial operation processing by using the one-touch-dialing key and a registered-information output processing according to this embodiment.

(1) Telephone Number Registration Processing

The telephone number registration processing is performed in such a manner that an operational environment is assumed in which 10 users use one communication apparatus according to this embodiment. In this operational environment, each of the 10 keys of the ten-key keyboard 22 are respectively assigned to the 10 users as registration numbers. When the telephone numbers are registered to the key 24 by each user, the ten-key keyboard 22 corresponding to the registration number of the user is depressed before the key 24 is operated. As the result, a desired telephone number can be registered to the key 24 as a one-touch-dialing key dedicated to the user.

Figure 6:
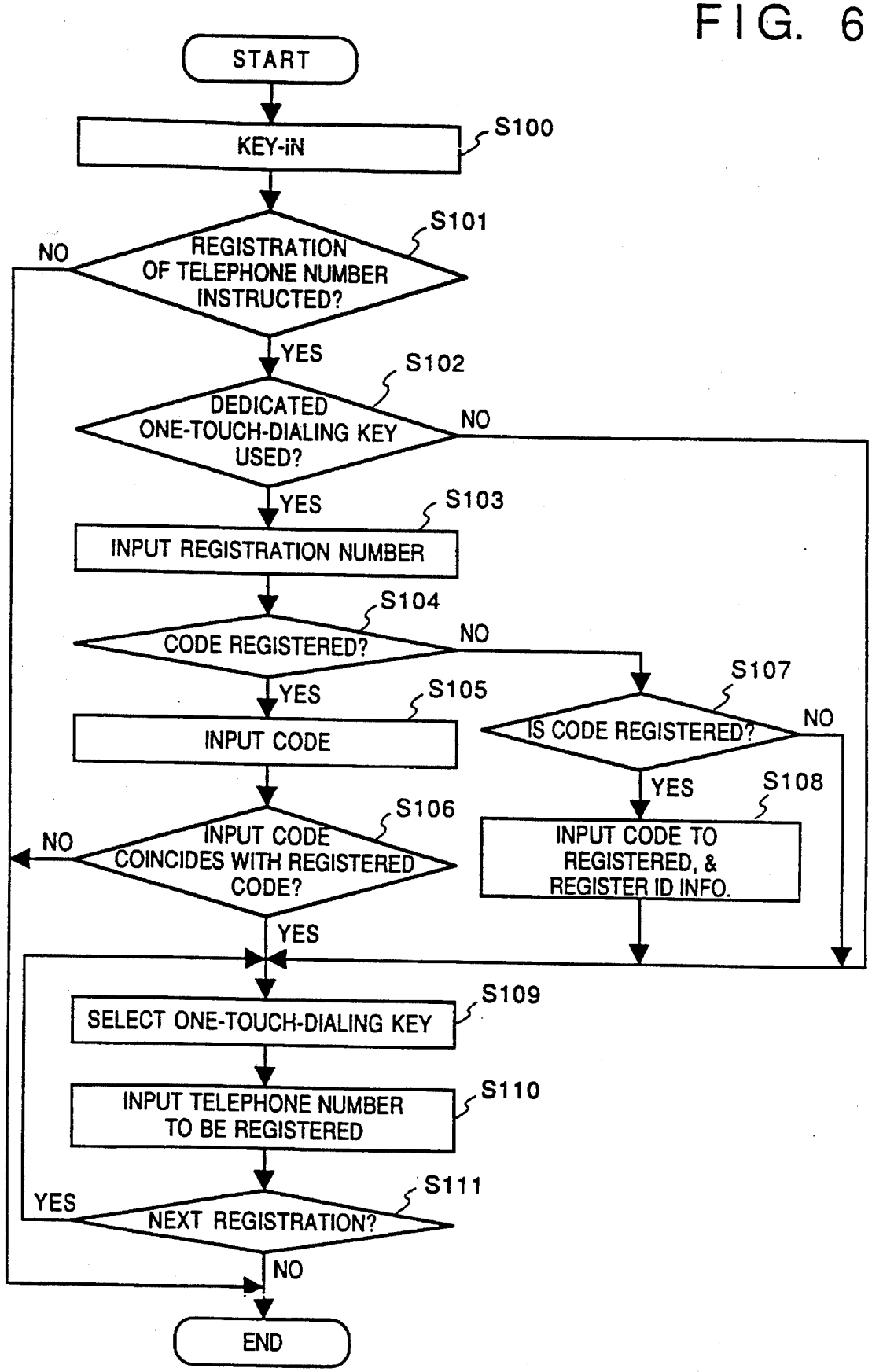
FIG. 6 is a flow chart which illustrates telephone numbers registration processing according to the second embodiment.

The processing of registering the telephone number to the key 24 will now be described with reference to a flow chart shown in FIG. 6. This embodiment has an arrangement that the commencement of the telephone number registration processing is instructed by depressing a programmable function key (hereinafter called a "PF key") 27 before the "0" key of the ten-key keyboard 22 is depressed.

In step S100, a key input is made to instruct the commencement of the telephone number registration processing. In next step S101, a discrimination is made as to whether or not the key input made in step S100 is a correct instruction (depressing of PF key 27 and "0"key) of the commencement of the telephone number registration processing. If a discrimination is made that the commencement of the telephone number registration processing has been correctly instructed, the flow proceeds to step S102. If it is negated, the process is terminated here.

In step S102, a user determines whether or not the one-touch-dialing key dedicated to the user is used before an instruction in accordance with the determination is inputted to the apparatus. If the user has determined to use the dedicated one-touch-dialing key, the user depresses the PF key 27 before the user depresses the start key 23 afterwards. In accordance with the instruction thus-made, the flow proceeds to step S103. If the user has determined that the dedicated one-touch-dialing key is not used, the user depresses the PF key 27 before the user depresses the stop key 26. In accordance with the instruction thus-made, the flow proceeds to step S109. The discrimination to be made in step S102 depends upon whether or not the operational environment allows for one user to use the apparatus exclusively. If the apparatus is exclusively used by one user, it is not necessary for the personal one-touch dialing key to be used. If the apparatus must be shared, it is necessary for the dedicated one-touch-dialing keys to be used.

In step S103, a registered number assigned to the user is inputted by using the ten-key keyboard 22. If the registered number has been inputted, the flow proceeds to step S104 in which registration of information required for the one-touch-dialing corresponding to the registration number is commenced.

In steps S104 to S108, a processing is executed for protecting the information for the one-touch-dialing corresponding to a certain registration number.

In step S104, discrimination is made as to whether or not a code corresponding to the inputted registration number has been registered. If a discrimination is made that the code has been registered, the flow proceeds to step S105. In step S105, the code is inputted. In next step S106, a comparison is made as to whether or not the inputted code coincides with the registered code. If the two codes coincide with each other, the flow proceeds to step S109. If they do not coincide with each other, the telephone number registration processing is terminated.

If the codes do not coincide with each other, registration operations such as a new registration, a change, and an addition of the telephone number are inhibited. In a case where a telephone number has been registered by a user to the one-touch-dialing key corresponding to the registration number inputted in step S103, change or addition of information by another user without the permission of the user can be prevented.

If a discrimination is made in step S104 that the code is not registered, the flow proceeds to step S107 in which the user determines as to whether or not to register a code. If the user registers the code, the user depresses the PF key 27 and then depresses the start key 23. If the user does not register the code, the user depresses the PF key 27 and then depresses the stop key 26. In accordance with the instruction thus made, the flow proceeds to step S109.

In step S108, the code and ID information corresponding to the code are registered. According to this embodiment, the code is registered in such a manner that, for example, a four-digit number (which is made to be the code) is inputted by using the ten-key keyboard 22 and the stop key 26 is depressed after the figure has been inputted.

The ID information is registered by inputting alphanumerics. If the subject ID information is four-alphanumerical characters "ABC538 the "1" key is depressed two times and the start key 23 is depressed one time to input "A". Then, the "1" key is depressed three times successively and the start key 23 is depressed one time to input "B". Then, "C" is inputted by depressing the "1" key four times successively and by depressing the start key one time afterwards. Then, the "5" key is depressed one time and the start key 23 is depressed one time to input "5". Finally, the stop key 26 is depressed one time and the registration of the ID information is completed. Thus, the alphanumerical characters "ABC5"can be inputted. The input information is sometimes used as an originator's information.

In next steps S109 to S111, the telephone number is registered to the key 24. The key 24 according to this embodiment has keys "A", "B", "C" and "D". In step S109, a key, to which the telephone number is to be registered, is selected from the four keys and is depressed. In next step S110, the telephone number to be registered is inputted by using the ten-key keyboard 22. In order to instruct the completion of the input of the telephone number, the key depressed in step S109 is again depressed here. Finally, whether or not the telephone number registration processing is continued is discriminated in step S111. If the key 24 is depressed, the flow returns to step S109 in which the registration processing is continued. On the other hand, if the stop key 26 is depressed, the registration processing is completed here.

Figure 7:
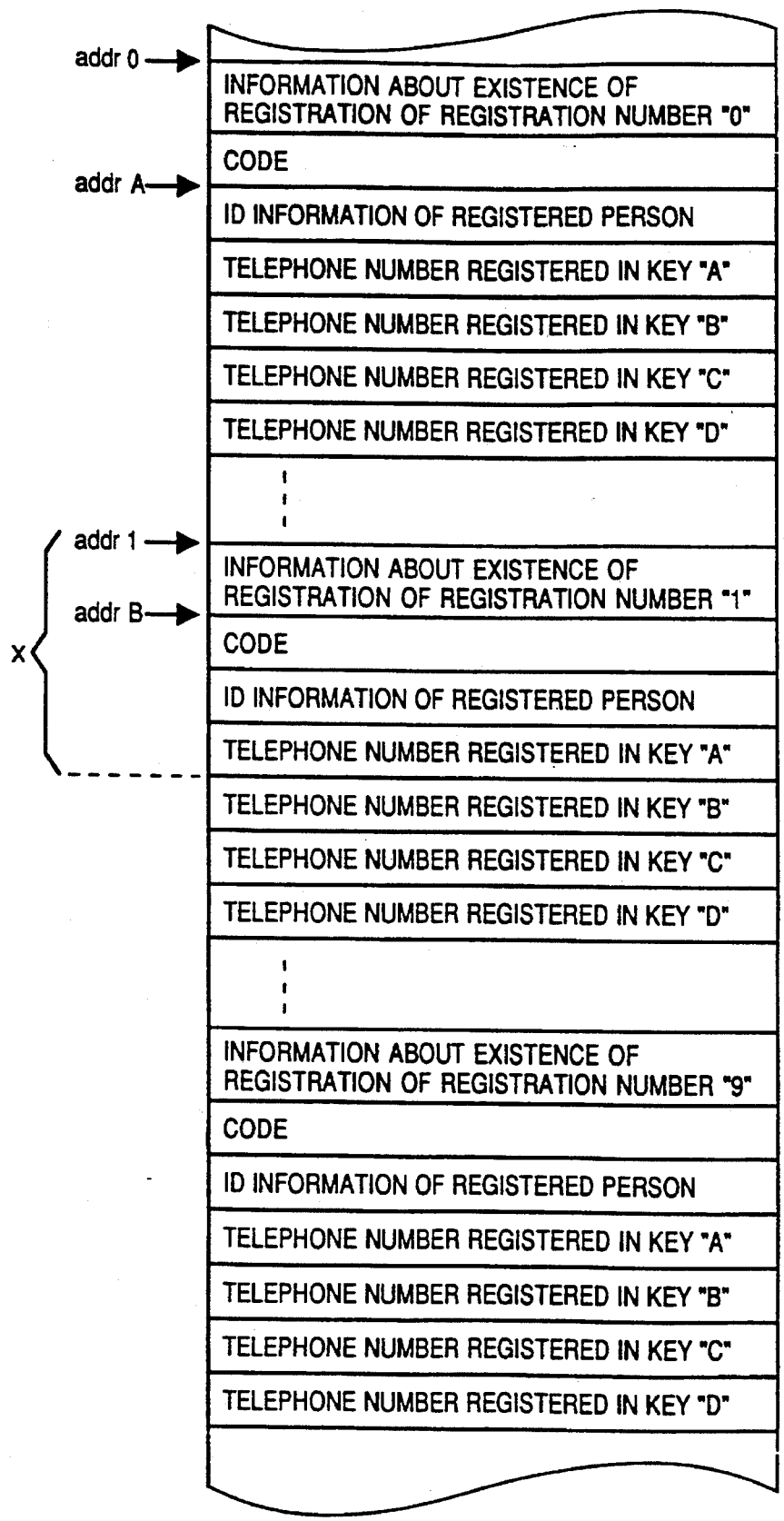
FIG. 7 illustrates a state where information of telephone number registration processing is stored.

FIG. 7 illustrates a state where the information registered due to the aforesaid processing is stored in the RAM 13. The information to be stored by the RAM 13 is exemplified by registration presence information showing whether or not the telephone number for one-touch-dialing has been registered, the code, information for identifying a registered person, and telephone numbers to be registered from the key "A" to key "D". The information for identifying a registered person is inputted by the processing in step S108, the information being exemplified by the registered name and employee identification number or the like. If the registration number is not specified in step S102, the registration information is stored in a registration number area "0" starting from addr 0 as shown in FIG. 7. In this case, no information is set because the code number and the information for identifying the registered person are treated as blanks.

Although only telephone number is inputted for the registration in step S110 of this embodiment, it goes without saying that not only the telephone number but also the corresponding subscriber's name can be inputted at the same time in a manner such that the ID information is registered in step S108.

(2) Dialing Operation

Figure 8:
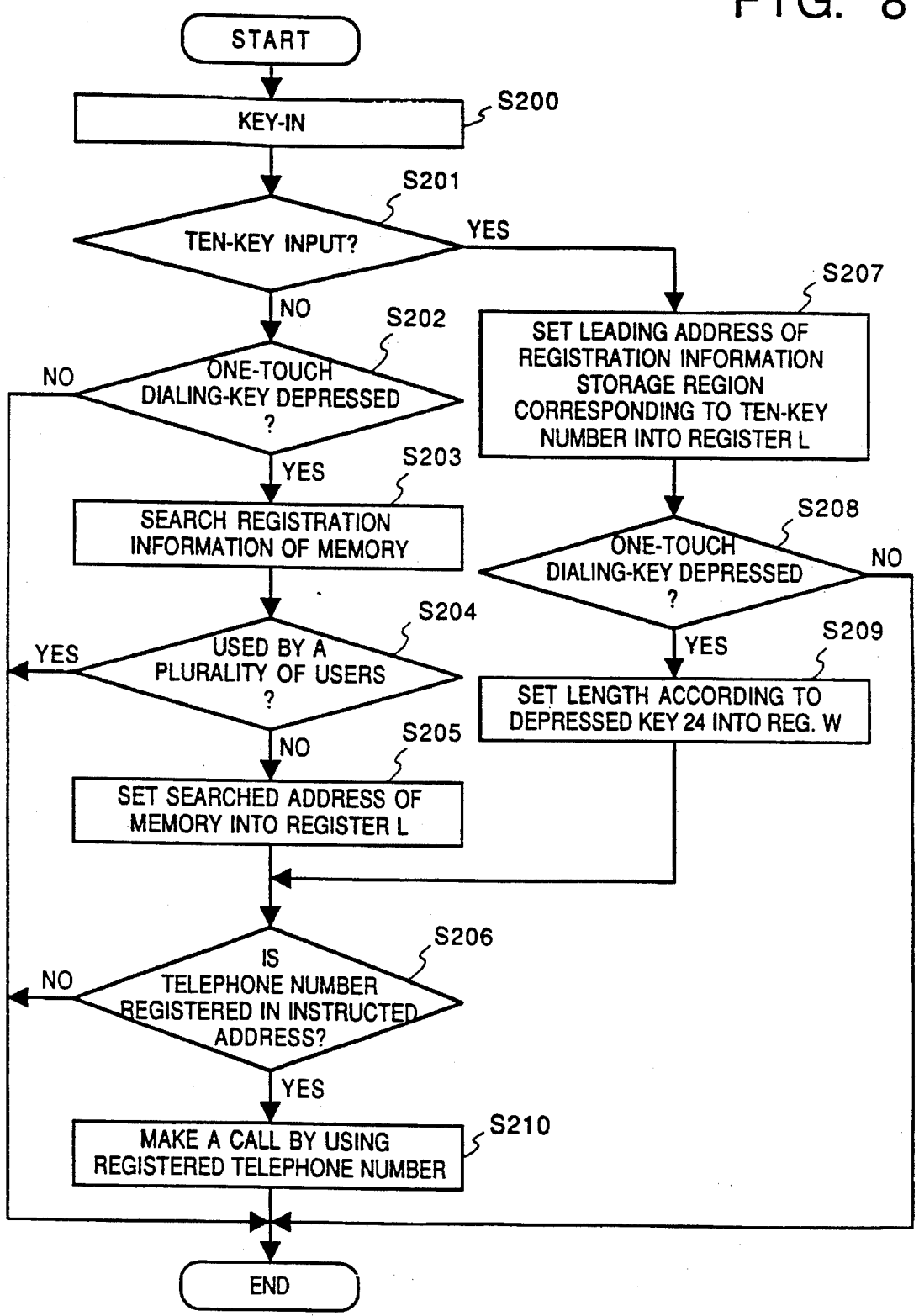
FIG. 8 is a flow chart which illustrates the procedure of a dialing operation according to the second embodiment.

A dialing operation by using registration information stored in the RAM 13 will now be described with reference to a flow chart shown in FIG. 8. The dialing operation is categorized to two operations. In one operation, the ten-key keyboard 22 corresponding to the user's registration number is depressed and then the key 24 is depressed the other operation, the key 24 is simply depressed.

If a key input operation has been made by using the operation unit 12 of the communication apparatus according to this embodiment in step S200, the flow proceeds to step S201. An examination is made in step S201 as to whether or not the key input operation is made by using the ten-key 22. If a discrimination is made that the ten-key keyboard 22 is not depressed, the flow proceeds to step S202 in which an examination is further made as to whether or not the key input operation has been made by using the key 24. On the other hand, if a discrimination is made that the input to the ten-key keyboard 22 has been made, the flow proceeds to step S207.

If a discrimination is made in step S202 that the key input operation has been made by depressing the key 24, the flow proceeds to step S203 in which information registered to the RAM 13 is addressed. On the other hand, if a discrimination is made that the key input operation has not been by depressing the key 24, the process is terminated here.

In step S204, an examination is made as to whether or not the keys 24 are being used by a plurality of users based on the result of the search of the RAM 13 executed in step S203. If only one user has registered information to the key 24 (that is, if the apparatus is exclusively used by one user and the input of the registration number is not performed and the dedicated one-touch-dialing key is not set), the flow proceeds to step S205. On the other hand, if a plurality of users have registered information to the key 24, the dialling operation is quitted and the processing is terminated here. Then, a message such as alarm information is displayed on the LCD panel 21.

In step S205, the address of the RAM 13 in which the telephone number is registered to perform the dialing operation is set to a register L (not shown) in accordance with the depressed key, If, for example, the key "A" is depressed at this time, addr A shown in FIG. 7 is set to the register L.

If a discrimination is made in step S201 that the key input operation is the input from the ten-key keyboard 22, the leading address of the area in which registered information corresponding to the registration number is stored is set to the register L in accordance with the figure of the depressed ten-key keyboard in step S207. If "1" of the ten-key keyboard 22 has been depressed, addr 1 shown in FIG. 7 is set to the register L. In next step S208, an examination is made as to whether or not the key 24 has been depressed, followed by depressing the ten-key keyboard 22. If the key 24 is not depressed, the processing is terminated here. If the key 24 has been depressed, the flow proceeds to step S209.

In step S209, the length from the address value set to the register L is set to a register W according to the depressed key 24. If the key "B" has been depressed, data length "x" shown in FIG. 7 is set to the register W. Then, the flow proceeds to step S206.

In step S206, an examination is made as to whether or not a telephone number has been registered in the storage area of the RAM, which is specified in accordance with either the address in the register L or the length and address in the register L and the register W. If a telephone number has been registered in the specified area, the flow proceeds to step S210 in which the operation of dialing the registered telephone number is performed. If no telephone number is registered in the specified area, the process is terminated.

(3) Registered Information Output Processing

Figure 9:
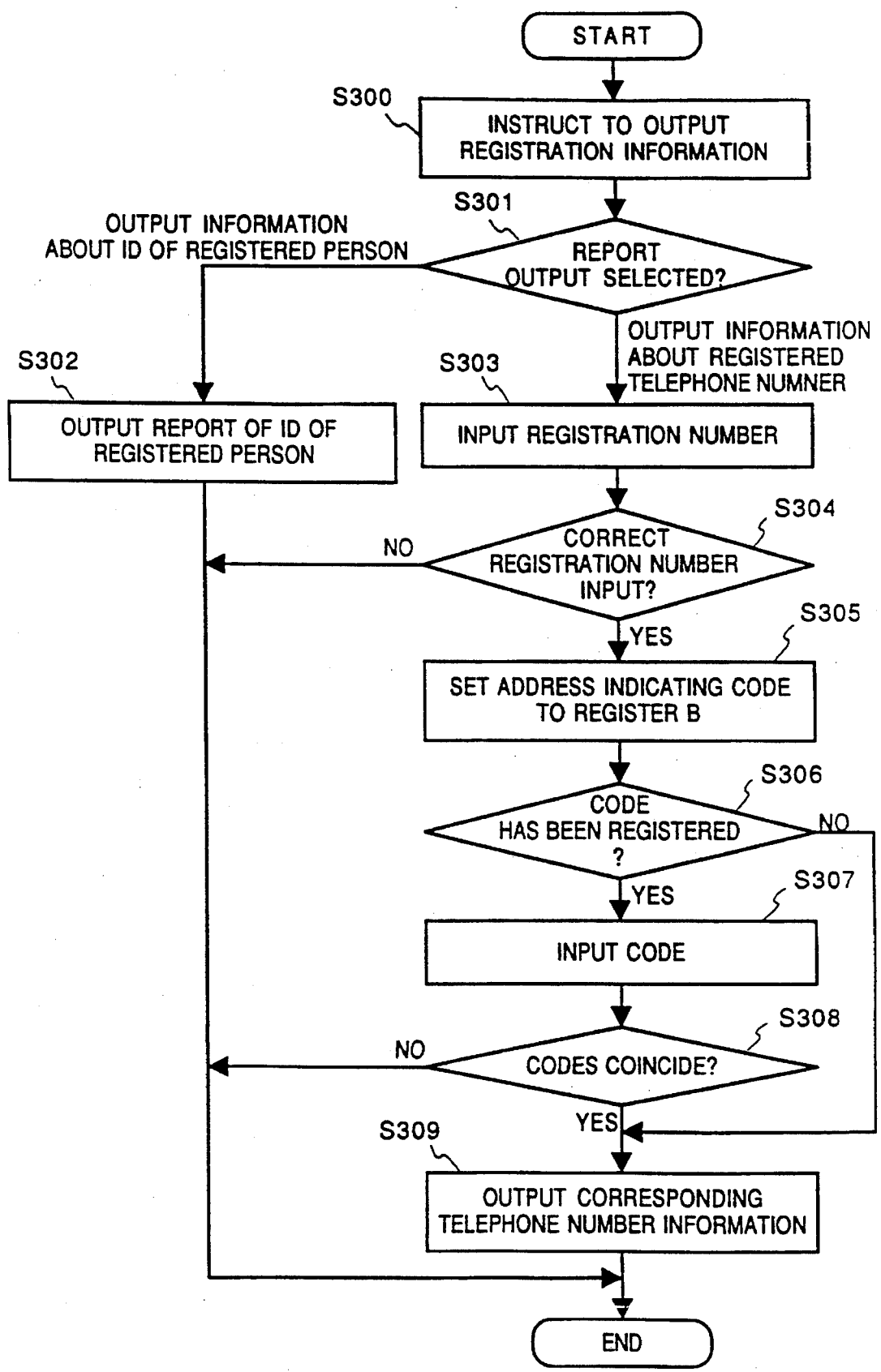
FIG. 9 is a flow chart which illustrates a processing for outputting registered information according to the second embodiment.

A processing for outputting the information registered by the telephone number registration processing (1) to the recording unit 14 will now be described with reference to a flow chart shown in FIG. 9.

In step S300, an instruction for outputting registered information is inputted by using the operation unit 12. In a case where information about the identification of the registered person is outputted, the instruction is made by depressing the PF key 27 and by afterwards depressing the "1"key of the ten-key keyboard 22 (hereinafter called "PF key + "1" key"). In a case where information about the registered telephone number is outputted, the PF key 27 is depressed and then the "2" key of the ten-key keyboard 22 is depressed (hereinafter called "PF key+"2" key").

In step S301, an examination is made that the contents of the instruction inputted in step S300. If the instruction to output the information for identifying the registered person has been made ("PF key+1"key"), the flow proceeds to step S302 in which the identification data of the registered person is read out so as to be outputted to an output unit of the recording unit 14. If the instruction to output the information about the registered telephone number has been made ("PF key+"2" "key"), the flow proceeds to step S303 in which an inquiry by displaying a message on the LCD panel 21 is made to a user whether or not the telephone number corresponding to the registration number stored in the RAM 13 is outputted. Then, an input of a registration number is waited for. The registration number is inputted by using the ten-key keyboard 22.

The input processing is then performed in step S304 in such a manner that an examination is made whether or not the correct registration number has been inputted in a predetermined time. If the correct registration number is not inputted within a predetermined time, the process is terminated here. If a correct registration number has been inputted in a predetermined time, the flow proceeds to step S305. In step S305, the address indicating the code among the registered information corresponding to the inputted registration number is set to a register B. If registration number "1" has been inputted, address addr B shown in FIG. 7 is set to the register B.

In accordance with the address value set to the register B, an examination is made in step S306 as to whether or not a code has been set to an area starting at the aforesaid address. If no code has been set, the flow proceeds to step S309. If the corresponding code has been set, the flow proceeds to step S307. In step S307, an inquiry of the code is made to the user who has inputted the code and an input of the code is waited for. If the code is inputted here, a comparison is made between the inputted code and the registered code in step S308. If the two codes coincide with each other, the flow proceeds to step S309. If the two codes do not coincide with each other, the process is terminated here.

Finally, the telephone number corresponding to the registration number is read from the RAM 13 to output the telephone number.

In accordance with this embodiment, it is not necessary to provide a multiplicity of one-touch-dialing keys corresponding to the number of the called stations. Furthermore, a multiplicity of telephone numbers can be registered by combining the ten-keys keyboard 22 and the keys 24. Consequently, this embodiment can easily be adapted to an environment in which the apparatus is shared by a plurality of users.

The key group 24 according to this embodiment has a function similar to a one-touch-dialing key adapted to a conventional one-touch-dialing operation if the same is not shared as a dedicated one-touch-dialing key by a plurality of users by depressing the ten-key keyboard 22 and by depressing the keys 24 afterwards. Therefore, the keys 24 can be used to enable the dialing operation by only operating the keys 24. Hence, an advantage can be realized in that a user of the conventional apparatus is able to easily operate the apparatus according to this embodiment.

Furthermore, in accordance with this embodiment, a code which has been registered before is first referred during the telephone number registration processing. By virtue of this aspect, the registered information can be protected from any attempt of change unless an inputted code coincides with the registered code, thus resulting in providing secured environment even in a multi-user operational environment.

In addition, the output of the identification data of the registered person helps a user to grasp about who has already registered and which number has been left for a registration. Thus, the user is able to recognize the number which can be used at the new registration. Therefore, it is very convenient if one apparatus is shared by a plurality of users. In addition, privacy of personal information can be protected because the code is checked by a comparison performed at the time of outputting the registered telephone number.

Although this embodiment has an arrangement that information is outputted to the output unit of the recording unit 14, the present invention is not limited to this. For example, the information may be displayed on the LCD panel 21.

Although this embodiment is arranged in such a manner that the comparison of the codes is performed at the time of the information registration and the output, the present invention is not limited to this. For example, the comparison of the codes may be performed at the time of the dialing operation.

The registration of the code number and the output of the registered information performed in the arrangement of the second embodiment may be adapted to the apparatus according to the first embodiment.

Figure 10:
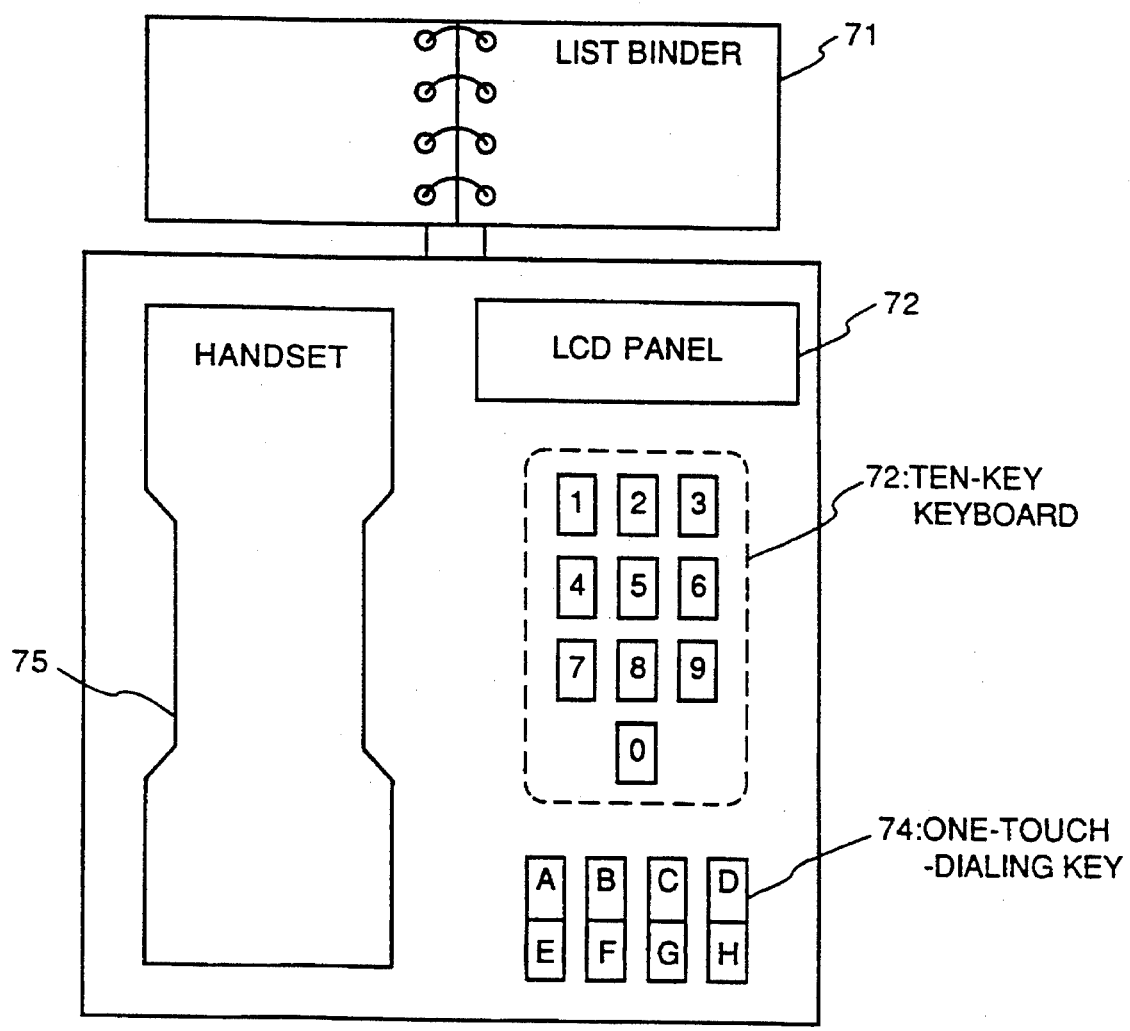
FIG. 10 is a top view which illustrates another embodiment of the operation unit of the communication apparatus.

The information outputted in the apparatus according to the second embodiment can be used as follows:

FIG. 10 illustrates the layout of the top view of an operation unit having a somewhat different layout from those according to the first embodiment or the second embodiment. The main difference from the first or the second embodiment lies in that a note-type list binder 71 is provided, 8 one-touch-dialing keys 74 are provided, a handset 75 can be installed and the layout of the components is altered. Referring to FIG. 10, reference numeral 72 represents an LCD panel, and 73 represents a ten-key keyboard.

FIGS. 11A and 11B illustrate an example of an output made in accordance with the second embodiment in which the information is held by the list binder 71. FIG. 11A illustrates output information (dial registration users list) denoting the users which have been registered to the registration numbers. FIG. 11B illustrates information (one-touch-dialing registration list), which has been registered by a user to which registration number "3"is assigned, corresponding to the one-touch-dialing keys 74 (8 keys A to H).

It is very convenient when a dialing operation is performed if the dial registration user list and the one-touch-dialing registration list are, as the list binder 71, fastened to the body of the apparatus in such a manner that users are able to easily use them. It might be considered feasible to employ a multiplicity of output formats for each page of the output information to be held by the list binder 71 as well as the format shown in FIGS. 11A and 11B. In order to provide security, the one-touch-dialing registration list may be individually held by the users which have registered it and the same is accessed individually at the time of the dialing operation.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus capable of abbreviated-dialing comprising:

a ten-key keyboard;

a function key;

storage means capable of storing a plurality of dialing numbers which correspond to the function key;

discriminating means for discriminating whether one dial number or a plurality of dialing numbers are stored in said storage means; and dialing means for dialing based on the one dialing number in accordance with an operation of the function key when said discriminating means discriminates that the one dialing number is stored, corresponding to the function key, and dialing based on one of the plurality of dialing numbers in accordance with the operation of the function key and input from the ten-key keyboard when said discriminating means discriminates that the plurality of dialing numbers are stored, corresponding to the function key.

2. The apparatus according to claim 1, wherein a relationship between said one dialing number and said function key is stored in a memory.

3. The apparatus according to claim 1, wherein a storage address of the one of the plurality of dialing numbers stored in said storage means is specified by the input from the ten-key keyboard and the operation of the function key.

4. The apparatus according to claim 2, wherein when only the one dialing number is stored in said storage means corresponding to said function key, a storage address of the dialing number is specified by said function key, and only the one dialing number is read from said storage means by the operation of the function key.

5. A dial method adapted to a communication apparatus having a ten-key keyboard and speed dialing keys, comprising:

an input step of inputting a registration number which specifies a particular user, a code number which is a password for a registration function and dialing information which specifies a called party;

a comparison step of comparing the code number inputted in said input step with a pre-registered code number corresponding to the registration number inputted in said input step;

a registration step of registering the dialing information corresponding to the registration number inputted in said input step and a speed dialing key when the inputted code number coincides with the pre-registered code number;

a readout step of reading the dialing information registered in said registration step in response to a key operation for specifying the dialing information; and a dialing step of dialing by using the dialing information read in said readout step in response to said readout step.

6. The method according to claim 5, wherein the dialing information in said readout step is read out in accordance with a number inputted from the ten-key keyboard and the speed dialing key.

7. A communication apparatus comprising:

a ten-key keyboard;

a speed dialing key;

storage means capable of storing a plurality of dialing numbers in accordance with a plurality of identification numbers and the speed dialing key;

discriminating means for discriminating whether a single dialing number is stored in said storage means, or a plurality of dialing numbers are stored in said storage means, corresponding to the speed dialing key; and dialing means for dialing based on the single dialing number in accordance with an operation of the speed dialing key when said discriminating means discriminates that the single dialing number is stored, and dialing based on one of the plurality of dialing numbers in accordance with the operation of the speed dialing key and a number inputted from the ten-key keyboard when said discriminating means discriminates that the plurality of the dialing numbers are stored.

8. The apparatus according to claim 7, wherein when the single dialing number related to the speed dialing key is stored in said storage means, said dialing means performs dialing only based on the operation of the speed dialing key.

9. The apparatus according to claim 7, wherein when a plurality of the dialing numbers related to the speed dialing key are stored in said storage means, said dialing means performs dialing based on the inputted number from said ten-key keyboard and a subsequent operation of the speed dialing key.

10. The apparatus according to claim 7, wherein said storage means has restriction means for restricting storage of the single or the plurality of dialing numbers.

11. The apparatus according to claim 10, wherein said restriction means has:

code number registration means for registering a code number for restriction;

code number input means for enabling a user to input a code at the time the single dialing number is stored or the plurality of dialing numbers are stored if said code number has been registered; and compare means for comparing the code inputted via said code number input means and the code number registered by said code number registration means, and restricting the storage if the code does not coincide with the code number.

12. The apparatus according to claim 7, further comprising output means for outputting the single or the plurality of dialing numbers stored in said storage means to a recording medium.

13. The apparatus according to claim 7, wherein the plurality of identification numbers identify registered users.

14. A dial method adapted to a communication apparatus having selecting means and a speed dialing key comprising the steps of:

discriminating whether one dialing number is registered, or plural dialing numbers are registered, corresponding to the speed dialing key;

dialing based on the one dialing number corresponding to the speed dialing key when it is discriminated in said discriminating step that the one dialing is registered; and dialing based on one of the plural dialing numbers corresponding to the speed dialing key and an input from said selecting means when it is discriminated in said discriminating step that the plural dialing numbers are registered.

15. The method according to claim 14, wherein the one of the plural dialing numbers is selected via a ten-key keyboard as said selecting means.

16. A calling apparatus for performing a process of calling, comprising:

a function key;

memory means capable of storing plural identifications for the function key;

discriminating means for discriminating whether one identification or plural identifications are stored in said memory means;

selecting means for enabling selection of one of the plural identifications stored in said memory means; and performing means for performing a first process based on the one identification when said discriminating means discriminates that the one identification is stored, and performing a second process based on one of the plural identifications selected via said selecting means when said discriminating means discriminates that the plural identifications are stored.

17. The apparatus according to claim 16, wherein said selecting means includes a ten-key keyboard.

18. The apparatus according to claim 16, wherein said performing means performs the first and second processes in accordance with an operation of the function key.

19. A method of performing a process in accordance with an operation of a function key for calling, comprising the steps of:

discriminating whether one identification or plural identifications are registered corresponding to the function key;

performing a first process based on the one identification when it is discriminated in said discriminating step that the one identification is registered; and performing a second process based on one of the plural identifications selected by a selecting operation when it is discriminated in said discriminating step that the plural identifications are registered.

20. The method according to claim 19, wherein the second process is performed based on the one of the plural identifications selected by the selecting operation using a ten-key board.

21. The method according to claim 19, wherein the first and second processes are performed in accordance with an operation of the function key.

* * * * *

UNITED STATES PATENT AND TRADEMARK OFFICE
CERTIFICATE OF CORRECTION

PATENT NO. : 5,509,067
DATED : April 16, 1996
INVENTOR(S) : Yukio Murata

It is certified that error appears in the above-indentified patent and that said Letters Patent is hereby corrected as shown below:

Column 10, line 29, delete "ABC538" and insert therefor --"ABC5" --

Column 11, line 17, delete "depressed," and insert therefor --depressed. In --.

Signed and Sealed this

Seventeenth Day of September, 1996

*Attest:*

BRUCE LEHMAN

*Attesting Officer*     *Commissioner of Patents and Trademarks*